March 29, 1966 D. D. AMIS 3,243,196
HANDLE ASSEMBLY
Filed Oct. 14, 1964 3 Sheets-Sheet 1

INVENTOR
Donald D. Amis
BY
ATTORNEY

March 29, 1966   D. D. AMIS   3,243,196
HANDLE ASSEMBLY

Filed Oct. 14, 1964   3 Sheets-Sheet 2

INVENTOR
Donald D. Amis

BY
ATTORNEY

March 29, 1966    D. D. AMIS    3,243,196
HANDLE ASSEMBLY

Filed Oct. 14, 1964    3 Sheets-Sheet 3

INVENTOR
*Donald D. Amis*

BY
ATTORNEY

United States Patent Office 3,243,196
Patented Mar. 29, 1966

3,243,196
HANDLE ASSEMBLY
Donald D. Amis, Des Moines, Iowa, assignor to American Machine & Foundry Company, a corporation of New Jersey
Filed Oct. 14, 1964, Ser. No. 403,798
4 Claims. (Cl. 280—47.37)

This invention relates to handle assemblies for vehicles controlled by walking attendants and more particularly, it concerns an adjustable and removable handle assembly particularly suited for use with rotary type lawn mowers.

In a copending application of Walter J. Larson and Harold D. Cook entitled, "Lawn Mower Height Adjusting Apparatus," Serial No. 403,712 filed October 14, 1964, there is disclosed an arrangement by which the body of a rotary lawn mower is supported from a pivoted frame assembly to which wheels, in turn, are attached. The height of the lawn mower body may be adjusted relative to the wheels and thus to the ground by a direct connection of the front wheels to the pivoted frame and by a linkage arrangement associated with the rear wheels so that the same pivotal movement also effects appropriate movement of the rear wheels. One of the features of the invention disclosed in the aforesaid copending application is the concentration of stresses imposed by loading to isolated portions of the lawn mower where they can be absorbed by a specially designed bracket and related components.

In accordance with the present invention, a handle assembly is provided which is particularly adapted for use in the lawn mower arrangement disclosed in the aforesaid copending application. Generally, the present invention involves a handle having a pair of side rails or struts connectable to a pivot pin effecting the principal connection of the rear wheel assembly to the lawn mower body. Thus the forces developed in and transmitted by the handle are concentrated at a point suitably reinforced to handle these stresses. Also, a unique arrangement is employed to render the handle adjustable in height and also to facilitate its removal for storage purposes without requiring elaborate tools or procedures.

A principal object of the present invention is therefore the provision of a handle assembly for rotary lawn mowers and similar walking-attendant controlled vehicles which is capable of adjustment to different levels or of removal simply and without requiring special tools.

A further object of this invention is to provide a lawn mower handle assembly which makes maximum use of existing lawn mower structure to effect its connection to the lawn mower.

A further object of this invention is to provide a handle assembly in combination with a unique adjustable height wheel mounting arrangement by which forces incident to both the handle and the wheels are concentrated at points of maximum strength.

Other objects and further scope of applicability of the present invention will be appreciated from the detailed description to follow taken in conjunction with the accompanying drawings in which.

Figure 1:
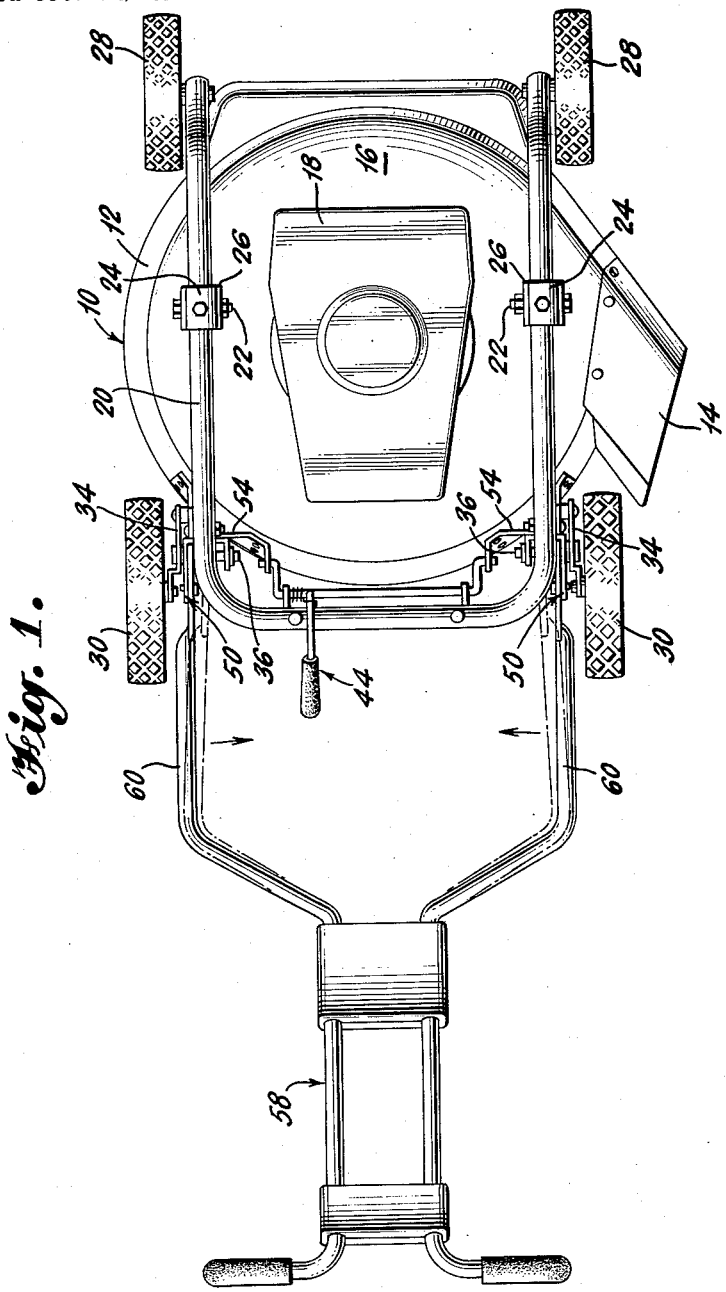
FIG. 1 is a plan view of a lawn mower incorporating the handle assembly of the present invention.
Figure 2:
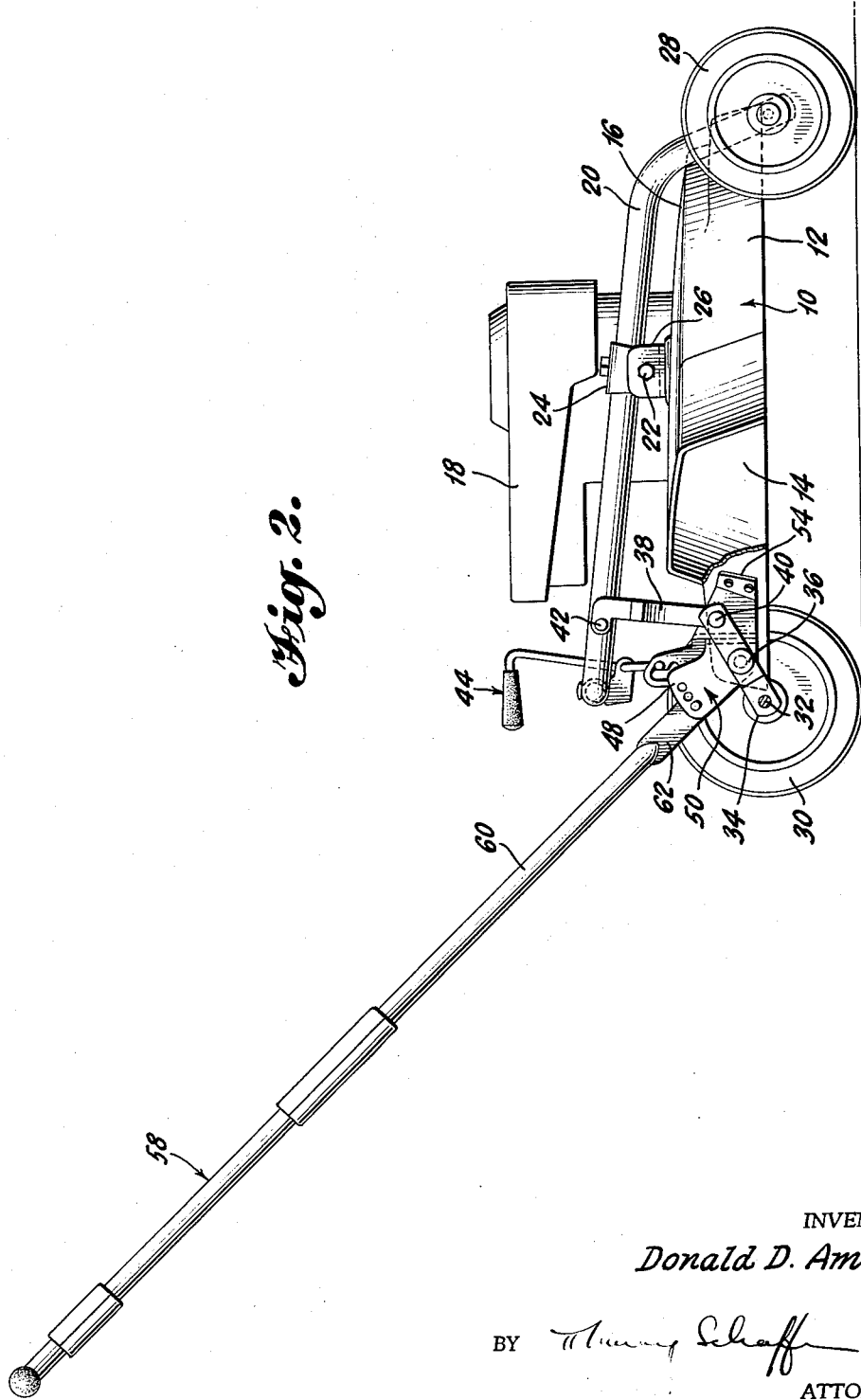
FIG. 2 is a side elevation of the lawn mower illustrated in FIG. 1.

Referring now to the drawings and particularly to FIGS. 1 and 2 thereof it will be found that a lawn mower is shown incorporating the height adjusting mechanism disclosed in the aforementioned copending application Serial No. 403,712, filed October 14, 1964. As shown, the lawn mower includes a body or housing 10 having a peripheral skirt 12 opening to a discharge chute 14. The body 10 is further characterized as being of circular configuration and having a generally flat upper surface or deck 16 on which an internal combustion engine 18 is situated. As described in the aforesaid copending application, the height adjusting mechanism includes a generally U-shaped pivotal frame assembly 20 connected to the upper portion of the body 10 by pivot bolts 22 extending through aligned apertures in tabs 24 and 26 associated with the frame and body, respectively. Front wheels 28 are journaled on stub axles directly connected to the front portions of the frame 20 whereas rear wheels 30 are journaled on axles 32 connected at the rear ends of levers 34 centrally pivoted on pins 36. The front ends of the levers 34 are connected to links 38 by pins 40, the links in turn being connected to the frame 20 by way of pins 42. A handle and latch assembly 44 is provided to permit pivotal adjustment of the frame 20 relative to the body 10 and thereby the relative position of the body to the wheels 28 and 30, as more fully described in the aforesaid copending application. It is to be understood that the height adjusting mechanism is not a part of the present invention as hereinafter described, and that the lawn mower including such a mechanism is merely illustrative of one environment in which the present invention can be used.

Figure 3:
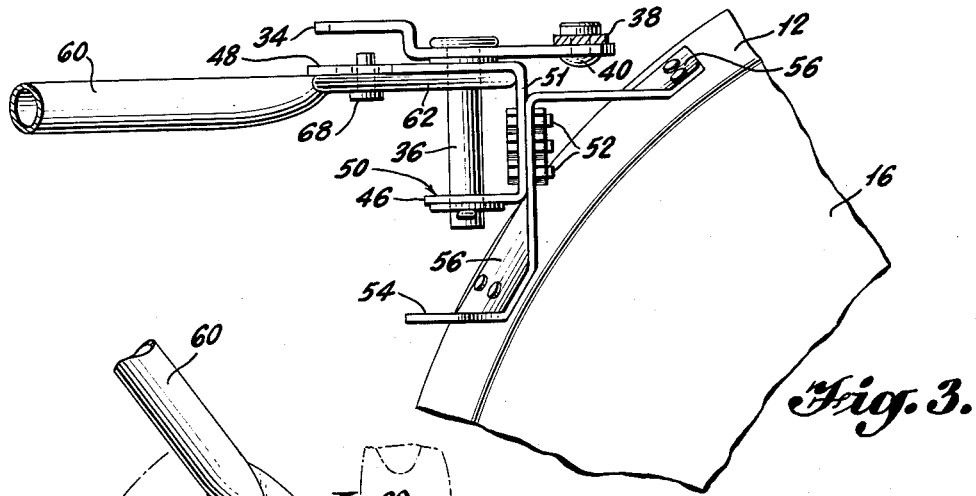
FIG. 3 is an enlarged fragmentary plan view showing the handle attachment assembly of the present invention.

As shown most clearly in FIG. 3 of the drawings the rear wheel assembly described above is connected to the body by mounting the lever pivoting pin 36 to extend through aligned apertures formed in rearwardly extending flange portions 46 and 48 of a handle bracket 50 having a base 51. The bracket 50 is secured by bolts 52 to one leg of an angle bracket 54 having a pair of bevelled portions 56 for securing to the skirt 12 by rivets or other suitable means.

Figure 4:
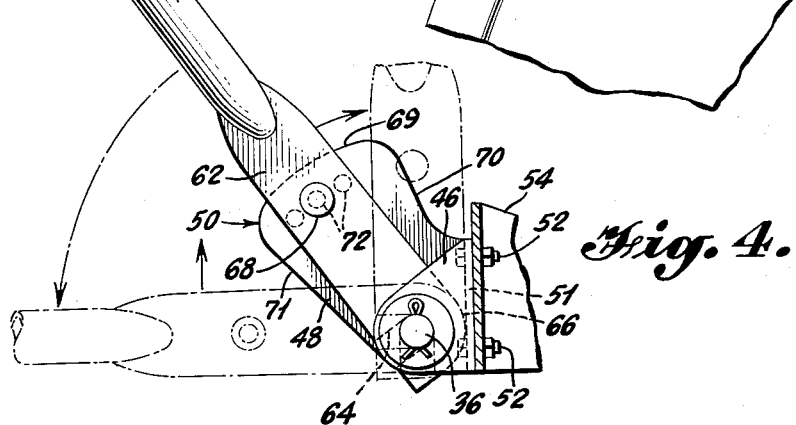
FIG. 4 is an enlarged fragmentary side elevation illustrating the lawn mower handle of this invention in solid lines in position of use and in phantom lines designating the positions to be assumed for storage and removal purposes, respectively.

The handle for the lawn mower thus illustrated is generally designated in the drawings by the reference numeral 58 and as shown, includes a pair of generally parallel, similarly shaped, tubular struts 60 each having a flattened end portion 62. As shown most clearly in FIGS. 4 and 5 of the drawings, each of the handle struts 60 is formed having a downwardly opening slot 64 near its terminal end for engaging the pin 36. As shown in FIG. 4, the slot 64 is spaced from the end of the strut by an amount slightly less than the distance between the pin 36 and the base wall 51 of the handle mounting bracket. Further, it will be noted that the upper edge of the strut end is provided with a radius 66 to define a nose portion for engagement with the base wall 51 in the handle mounting bracket. At a point in the flattened end portion 62 of each strut but spaced from the slot 64 a pin 68 is mounted. In the embodiment shown, the pin 68 extends through an aperture in the end portion 62 and may be held in place by a force fit, welding, brazing or the like. It will be appreciated, however, that other specific forms of pin means may be employed. For example, a conventional bolt type connector might be employed in place of the specific type of pin 68 shown.

Figure 5:
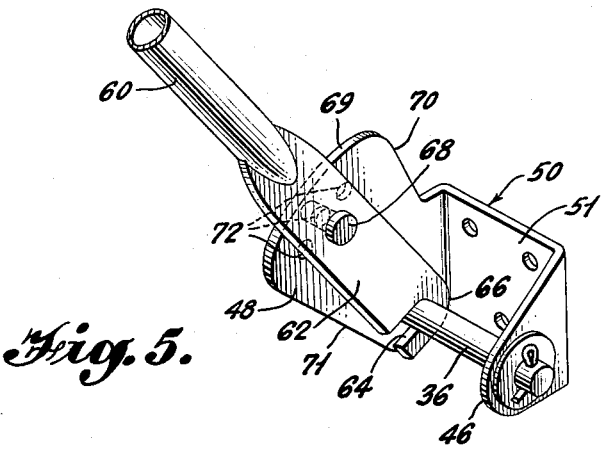
FIG. 5 is a enlarged fragmentary perspective view showing the handle mounting assembly of the present invention.

As shown in FIGS. 2, 4 and 5 of the drawings, the outer flange 48 on each of the brackets 50 extends upwardly and rearwardly to define a sector-shaped ear having a rounded upper edge 69 merging in forward and rearward edges 70 and 71, respectively. Toward the upper edge 69, a plurality of apertures 72 are formed and spaced on an arc developed about the axis of the pin 36, the radius of the arc being equal to the distance between the slot 64 and the pin 68 in each of the handle struts 60. Thus it will be appreciated that the apertures 72 will receive the pin 68 when the pin 36 is engaged by the slot 64.

With the pin engaged in one of the apertures 72, a moment arm is established to hold the handle struts 60 in their adjusted position. To illustrate, movement in a clockwise direction about the pin 68 is prevented by the pin 36 engaging the base of the slot 64. Also, movement of the handle in a counter-clockwise direction about the pins 68 is prevented by engagement of the nose 66 with the base wall 51 of the handle mounting bracket 50. It will be apparent therefore, that the handle 58 can be adjusted to different operating heights by selecting appropriate ones of the apertures 72 in each of the rearwardly extending flange positions 48 for engagement by the pin 68. Also, in the type of handle shown it is possible that the struts 60 may be arranged to be resiliently biased outwardly against the flange members 48 so that the adjustment can be effected merely by urging the struts inwardly toward one another until each of the pins 68 becomes disengaged or separated from the aperture in which it has been engaged, and the resetting accomplished by allowing the handle struts to move outwardly.

A further feature of the handle assembly of the present invention is the manner in which the handle may be simply and quickly removed from the lawn mower for transportation, for example, or moved to a position particularly suited to storage purposes. Assuming, for example that conservation of lateral or floor space is desired during storage, the pins 68 are retracted from the apertures 72 and the handle moved to a vertical position. As shown by phantom lines in FIG. 4 the handle will be retained against forward movement from this position by the base 51 of the bracket 50 and against rearward movement by engagement of the pins 68 with the forward edges 70 of the flanges 48. If, on the other hand it is desired to remove the handle 58, the pins 68 are disengaged from the apertures 72 and the handle permitted to move to a substantially horizontal position as shown in phantom lines in FIG. 4. When in this position, the radius portion 66 no longer is held in contact with the base 50 so that the handle struts may be simply raised upwardly out of engagement with the pin 36 and removed.

Thus, it will be appreciated that by this invention there is provided an extremely effective handle assembly by which the above-mentioned objects are completely fulfilled. While certain features of the assembly render it applicable to numerous situations and different specific uses, it is particularly suited for the organization constituting the lawn mower shown in the drawings and described above because of the manner in which the number of parts required to effect the attachment of the handle is reduced to a minimum and also because of the manner in which the forces resulting from stresses exerted on the handle are concentrated in the bracket structure by which these forces may be resisted. Such further features as the adjustability and removability features described further enhance the assembly in this environment though it will be appreciated that these features are desirable in other environments.

Since therefore modifications can be made in the present invention and it may be adapted to environments other than those described above it is to be distinctly understood that the foregoing description is illustrative only, not limiting, and that the true spirit and scope of the present invention is to be determined by the appended claims.

What is claimed is:

1. A handle assembly for a wheeled vehicle of the type guided by a walking attendant, said assembly comprising a pair of brackets adapted to be fixed to the vehicle in spaced relation, each of said brackets having a base member with a generally rearwardly facing base surface and a flange member extending rearwardly from said base surface, a handle having a spaced pair of struts with end portions thereof disposed adjacent said flange members, end surfaces on said strut end portions, releasable connecting means pivotally connecting at least one of said struts to its adjacent flange member at a point spaced from the end surface of said strut, and restraining means disposed adjacent said end surfaces pivotally connecting said strut end portions to said flange members and simultaneously limiting the pivotal movement of said struts about said connecting means, said restraining means comprising a circular pin extending transversely from each of said flange members with a predetermined minimum spacing between the surface of said pins and the adjacent base surfaces, and elongated slots in said strut end portions adjacent said end surfaces, said slots being disposed on said pins and having an open end and a slot wall, said slot walls abuttingly engaging said pins to limit the pivotal movement of said struts about said connecting means in one direction, said strut end surfaces abuttingly engaging said base surfaces to limit said pivotal movement in the other direction, said end surfaces being spaced from the adjacent portion of said slot wall an amount no greater than said predetermined spacing whereby said struts are pivotally movable on said pins when said connecting means is released.

2. The handle assembly recited in claim 1 in which said struts are resiliently biased towards said flange members.

3. The handle assembly recited in claim 2 in which said connecting means includes a pin carried by at least one of said struts and receivable in one of several spaced apertures formed in said one flange member.

4. The handle assembly recited in claim 3 in which said one flange member is shaped to define a forwardly facing edge for engagement by said pin to retain said handle in a substantially vertical storage position.

References Cited by the Examiner

UNITED STATES PATENTS

| 772,253 | 10/1904 | Ray | 280—47.37 X |
| 1,806,460 | 5/1931 | Hopkins | 280—43.16 |
| 2,123,813 | 7/1938 | Stiles | 61—111 |
| 2,757,013 | 7/1956 | Brier | 280—47.37 |
| 3,038,737 | 6/1962 | Lill | 280—47.37 |
| 3,116,937 | 1/1964 | Price | 280—47.37 |

BENJAMIN HERSH, *Primary Examiner.*

C. C. PARSONS, *Assistant Examiner.*